Nov. 3, 1953     A. SCHOCH     2,658,020
METHOD OF PREPARING A HEMOSTATIC AGENT
Filed June 8, 1949
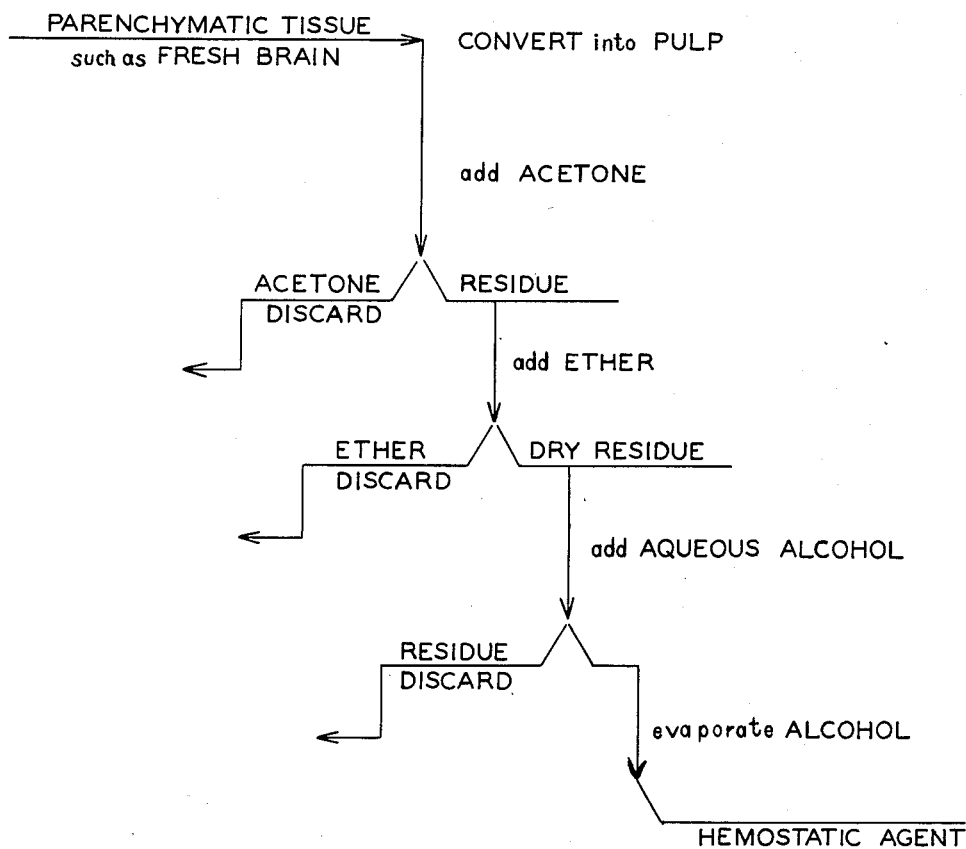
INVENTOR.
ADRIEN SCHOCH
BY Pollard V Johnston Patented Nov. 3, 1953

2,658,020

UNITED STATES PATENT OFFICE 2,658,020

METHOD OF PREPARING A HEMOSTATIC AGENT

Adrien Schoch, Berne, Switzerland, assignor to Gibone Trust, Vaduz, Liechtenstein Application June 8, 1949, Serial No. 97,920
Claims priority, application Switzerland
June 11, 1948

5 Claims. (Cl. 167—74)

This application relates to a new hemostatic agent and its preparation. More particularly, it relates to a hemostatic agent which may be administered intravenously without shock or clotting of the blood within the veins or vessels.

In my related application, Serial No. 590,522, filed April 26, 1945, now Patent No. 2,527,579, I have discussed the various types of known hemostatic agents. It was therein pointed out that up until the time of the filing of said application, hemostatic agents were available only for topical and subcutaneous and possibly oral administration. At that time hemostatic agents were not available which were suitable for intravenous injections, for known hemostatic agents when intravenously injected caused excessive shock, thrombosis or embolism, i. e., blood clots in the veins. In accordance with said prior application, for the first time a hemostatic agent was provided which was suitable for intravenous injections. This novel hemostatic agent was substantially free of albumin and could be safely administered without the formation of dangerous or fatal blood clots.

In accordance with the present invention, an improved process and an improved hemostatic agent suitable for intravenous injection are provided. The hemostatic agent of my prior filed application was free or substantially free of albumin but still contained other protein substances or conjugated proteins such as peptides or polypeptides and the like which at times caused limited anaphylactic shock. The hemostatic agent of my prior application was also sufficiently stable to heat of 100° C. for the purpose of sterilization, but not above 100° C., precipitations being formed, while the hemostat of this invention is stable even at temperatures above 100° C. The hemostatic agent of the present invention is completely free of proteins, including albumins, as well as peptides and polypeptides as is apparent from a negative biuret reaction. This complete freedom from proteins or complexes containing proteins which are easily converted into proteins permits the products of this invention to be administered intravenously without shock and provides a product which is much more stable to heat.

The same amount of the product is more active than the hemostatic agent of my prior application.

In order to achieve the objectives of this invention, the hemostatic ingredients of mammalian organs (cattle, sheep, pig etc.) such as brain, liver, lung, and kidney substances are obtained by a plurality of correlated treatments or extractions eventually after maceration. The organs are freed of undesirable membranes and washed with water in the conventional way. The fresh organ is then reduced to an aqueous pulp or paste with conventional homogenizing devices. The homogenized paste or pulp of the animal organ is dried or treated with an organic solvent which removes the water from the aqueous paste. In a special embodiment acetone is used, to extract the water and at the same time serve the useful function, among others, of extracting certain neutral fats. Other organic solvents miscible with water which have the capacity to bind the water of the homogenized organ pulp may be used; for example, methyl ethyl ketone and other low molecular weight ketones and their homologues. After the animal organ has been extracted with acetone or similar substances, the acetone or other dehydrating agent is separated from the solid substance in a known manner as by filtration. The drying of the material could also be obtained by drying below 0° C. in a high vacuum, i. e. from the frozen state of the material. Also a moderate heating, but not more than 100° C. could be applied. Furthermore a drying with infrared rays is possible. The separated solids may either be dried to form a stable powder which may be stored for extended periods of time at low temperature or may be immediately subjected to the next step in the treatment process.

The animal organ is also extracted with an organic solvent which dissolves fats or lipoids present in the animal organ substance. Ether is advantageously used in this step due to its capacity to dissolve lipoids having no hemostatic effects and due to its ready volatility. After the extraction of the fats or lipoids with the fat dissolving compound, the solvent is separated and the remaining substances dried to form a powder. The substances may be separated from the liquids by filtration or by centrifuging or by other conventional methods. The resulting powder may be stored for a long period of time at a low temperature.

After the previous extractions, the remaining organ substance is agitated for ten minutes with an aqueous alcohol which serves the function of dissolving out the hemostatic agent. In a special embodiment of the invention, aqueous ethanol is used. It is believed that the alcohol splits the lipoproteins into protein and lipoid substances including phospholipins or phosphatides which include the active hemostatic agent. The phosphatides containing the active hemostat are soluble in the aqueous alcohol, while the insoluble proteins and the like separate out. In this step other aqueous alcoholic solutions such as those obtained from methanol or propanol may likewise be used.

The aqueous alcohol solution of the active hemostatic agent may be concentrated to give a valuable hemostat by evaporating the alcohol. However, it is advantageous to evaporate the alcohol and water from the dissolved hemostatic agent at a low temperature, usually not substantially exceeding 40° C., under vacuum and thereby provide a stable powder. If desired, the powder may be advantageously dissolved in water and any undissolved substances separated therefrom to give a hemostatic agent of increased purity. The resulting powder is readily soluble in water, is thermally stable in aqueous solutions above 100° C. for 15 minutes, and thereby may be easily rendered sterile. The obtained product gives a negative biuret reaction, thereby showing a complete absence of proteins.

Clinical evaluation of my stable water soluble hemostatic agents in the treatment of conditions known to affect the various blood-stanching mechanisms have shown that they have the surprising property of favorably affecting all three of the known blood-stanching mechanisms, namely, the coagulating mechanism, the thrombocyte mechanism, and the blood vessel mechanism. This attribute is in marked contrast with the properties of known hemostats which are usually specifics for one of the hemostatic factors.

The product is a natural activator, which influences and accelerates the first phase of blood-clotting. Also it shortens the time of bleeding from blood vessels, since it influences their mechanism of clotting blood. It accelerates the retraction of the blood clot, as it promotes the formation of thrombin, both in normal and hemophilic subjects.

The product can be utilized intravenously, intramuscularly, as a blood-stanching powder on wounds, and in wound dressings. It is indicated in the following cases: Hemophilia and other hemorrhagic diatheses as a blood-stanching drug in hurt patients, to reduce bleeding in all surgical operations, (as well as pre- and post-operative injections) to stop bleeding from the lungs, stomach, intestines, bladder, in medicine, to stop bleeding in obstetric gynecological, ophthalmological and other cases.

The product contains no protein at all (negative biuret-test even in 10 per cent solution). It causes on repeated reinjection no anaphylactic shock, neither in guinea pig nor in man. It produces no toxic effects.

It can even in aqueous solution be heated in the autoclave to 115° C. without losing its activity. As a dry powder it can be stored years without losing its activity. It is very easily soluble in water (500 mg. per cc. of water).

In vitro it shortens the recalcification time at least 60 per cent. It accelerates the blood clotting time in rabbits and human subjects, in the latter especially in hemophilia.

The invention will be readily understood by the following examples encompassing the illustrative embodiments of my invention.

*Example 1*

A fresh cattle brain is freed from cerebral membranes and is rinsed with water until clean. The brain freed from blood is converted in a homogenizing device into a completely homogeneous pulp or paste. For example, an electric mixer known as a "Turmix" may be used. This paste is shaken with about five times its volume of anhydrous acetone cooled to 0° C. for fifteen minutes in an agitating apparatus. After the removal of the upper acetone layer, the same amount of cooled anhydrous acetone is added again, and the mixture is shaken for an additional fifteen minutes. The paste is now freed from acetone by suction filtration. The acetone removes the water and certain neutral fats originally present in the pulp and causes the precipitation of albumin. After the removal of the acetone, the product, if desired, is washed several times with cold acetone.

The residue obtained after the acetone extraction may be further treated immediately. On the other hand, the product may be separated in a thin layer on a filter paper or other suitable surface and permitted to dry, thereby obtaining in a few hours a dried powder which is stable for a long time if stored in a refrigerator.

The product obtained after the acetone extraction, in the dried condition or in the moist state, is mixed with ethyl ether, cooled to 0° C., and is shaken in an agitating device for about thirty minutes. When using the moist or wet pulp obtained after the acetone extraction, the volume of ether used is advantageously about ten times the volume of the wet pulp. After agitation for the stated period of time, the ether is removed by passing the liquid through a suction filter. The residue is spread in a thin layer for a short period of time, for example, about thirty minutes, and is dried in the air. The product thus obtained is likewise stable for a long time if stored at a low temperature.

It is essential that the brain substance be dried before the treatment with alcohol because the solubility of the dried pulp in alcohol is superior to that of the wet pulp.

The powder obtained after the foregoing extractions is shaken with ten times its volume of 40–70 per cent aqueous ethanol (60 per cent being the optimal concentration), cooled to 0° C., for thirty minutes in an agitating apparatus. This treatment is believed to split the lipoproteins into proteins and lipoids including phosphatides. The phosphatides are considered to be an active blood-stanching substance or hemostatic agent which dissolve in the ethanol while the albumin and like proteins remain undissolved. The alcoholic phosphatide solution is separated from the residue, for example, by filtration, centrifuging, or decanting, and the liquids in the solution subjected to evaporation at low temperatures under a high vacuum until a dried product is obtained.

The process of this example may be illustrated by the accompanying flow-sheet.

The active substance obtained from the alcoholic solution is a yellowish white powder which is readily soluble in water. The aqueous solution is thermally stable and can be heated in an autoclave at 115° C. for fifteen minutes without loss of activity. The product gives a negative biuret reaction.

If desired, the powder containing the active ingredients may be dissolved in water and any undissolved substances separated in a conventional manner and a powder again obtained by evaporating off the water.

It is also possible to obtain a valuable hemostatic agent merely by subjecting the alcoholic solution to evaporation under vacuum until all the alcohol is removed. The residue which still contains water is diluted to the desired concentration with water after any insoluble substances are removed by centrifuging. In this way, a hemostatic agent suitable for administration can be obtained without the necessity of obtaining a dried product.

In practicing the preceding process, the homogenized brain pulp obtained as described hereinbefore may be macerated in a refrigerator at 5° C. for ten hours prior to the described treatment with acetone, ether, and ethanol. During the maceration the proteolytic ferments present in the brain pulp at least partially convert the lipoproteins into phosphatides and albumin. The splitting is then completed in the treatment with the ethyl alcohol.

*Example 2*

Cattle lung in the fresh state is freed from blood by directing a strong jet of water toward the arteries of the lung until the tissue appears to be cheesy-white. The lung substance so treated contains a large amount of water and is readily comminuted by hand. After comminution, the product is squeezed free of as much water as possible and converted into a homogeneous pulp in an electric homogenizer. The homogenized pulp is then treated in a manner described in the preceding example. The product obtained has the same characteristics as the product described in the preceding example.

It will be understood that the foregoing disclosure and description are illustrative of my invention and that many modifications and variations will occur to those skilled in the art and yet be within the scope of the invention which is defined by the appended claims.

I claim:

1. A process for producing a hemostatic agent suitable for intravenous injection comprising extracting the aqueous content of the pulp of mammalian organ selected from the group consisting of brain, liver, lung, and kidney with acetone, separating the acetone from said pulp, extracting fat in the mammalian organ with ethyl ether, separating the ethyl ether from the organ substance, agitating the extracted organ substance with 40 to 70 percent aqueous ethanol to form a solution of the hemostatic agent, separating the aqueous alcohol solution from undissolved substances, and evaporating off the alcohol to provide an aqueous solution of the active hemostat.

2. A process for producing a hemostatic agent suitable for intravenous injection comprising extracting the aqueous content of the pulp of mammalian organ selected from the group consisting of brain, liver, lung, and kidney with acetone, separating the acetone from said pulp, extracting fat in the mammalian organ freed of water with ethyl ether, separating the ethyl ether from the organ substance, drying the mass after the extraction of the fat to form a powder, agitating the dried powder with 40 to 70 per cent aqueous ethanol to form a solution of the hemostatic agent, separating the aqueous alcohol solution from undissolved substances, and evaporating off the liquid to form a powder containing the hemostatic agent.

3. A process for producing a hemostatic agent suitable for intravenous injections comprising dehydrating a cleaned and washed paste of a fresh mammalian organ selected from the group consisting of brain, liver, lung, and kidney with acetone, separating the acetone from said paste, extracting the fat in the dehydrated paste with ethyl ether, separating the ethyl ether and drying to form a powder, agitating the dried powder with 40 to 70 per cent aqueous ethanol to extract the hemostatic agent, separating the ethanol solution from undissolved substances, evaporating the aqueous ethanol solution to form the powder containing the hemostatic agent, and dissolving the powder in an aqueous solution and subjecting the solution to sterilization temperatures of the order of 100° C. to provide a hemostatic agent suitable for intravenous injection.

4. A process for producing a hemostatic agent suitable for intravenous injections comprising a series of extractions under refrigerative conditions of the order of 0° C. including extracting the aqueous content of the pulp of mammalian organ selected from the group consisting of brain, liver, lung and kidney with acetone, separating the acetone from the mammalian mass, agitating the separated mammalian mass with ethyl ether and drying the agitated mass to form a powder of the undissolved organ substances, agitating the dried organ substances in 40 to 70 per cent aqueous ethanol to form a solution of the hemostatic agent, and evaporating the aqueous alcohol solution to convert the dissolved substances into a powder.

5. A process for producing a hemostatic agent comprising extracting fresh mammalian brain with acetone, separating the acetone from the mammalian mass, agitating the separated organ mass with ethyl ether and drying the agitated mass to form a powder of the undissolved organ substances, agitating the dried organ substances in 40 to 70 per cent aqueous ethanol to form a solution of the hemostatic agent, and evaporating the aqueous alcohol solution to convert the dissolved substance into a powder.

ADRIEN SCHOCH.

References Cited in the file of this patent

UNITED STATES PATENTS

| Number | Name | Date |
|---|---|---|
| 1,162,863 | Ripke | June 20, 1939 |
| 2,408,535 | Smith | Oct. 1, 1946 |
| 2,527,579 | Schoch | Oct. 31, 1950 |

OTHER REFERENCES

Chargaff in "Advances in Enzymology," volume V, 1945, pages 39 and 40.

Chargaff in Journal Biol. Chem., volume 155, 1944, pages 387 to 399.

Hawk: "Practical Physiological Chemistry," 1947, 12th edition, page 157.

Quick: "The Hemorrhagic Diseases," 1942, pages 64 to 68, 72, 73.

Suto-Nagy in Journal Biol. Chemi., December 1944, pages 433–441.